(12) United States Patent
White

(10) Patent No.: US 6,637,995 B1
(45) Date of Patent: Oct. 28, 2003

(54) SUPER-ELASTIC RIVET ASSEMBLY

(76) Inventor: Patrick Michel White, 2208 Lancaster Ct., Mahwah, NJ (US) 07430

( * ) Notice: Subject to any disclaimer, the term of this patent is extended or adjusted under 35 U.S.C. 154(b) by 0 days.

(21) Appl. No.: 09/501,109

(22) Filed: Feb. 9, 2000

(51) Int. Cl.$^7$ .................... F16B 13/06; F16B 21/00
(52) U.S. Cl. .................. 411/339; 411/70; 411/501; 411/512; 411/902
(58) Field of Search ................ 411/43, 69, 70, 411/338, 339, 500, 501, 512, 901, 902

(56) References Cited

U.S. PATENT DOCUMENTS

| | | | |
|---|---|---|---|
| 3,971,566 A | 7/1976 | Levinsohn et al. | 277/206 |
| 4,281,841 A | 8/1981 | Kim et al. | 277/236 |
| 4,447,944 A * | 5/1984 | Mohrman | 411/70 X |
| 4,537,406 A | 8/1985 | Hirasuna | 277/1 |
| 4,665,906 A | 5/1987 | Jervis | 128/92 |
| 4,678,384 A * | 7/1987 | Sparling et al. | 411/69 X |
| 4,702,655 A * | 10/1987 | Kendall | 411/70 X |
| 4,773,680 A | 9/1988 | Krumme | 285/381 |
| 4,781,501 A * | 11/1988 | Jeal et al. | 411/69 X |
| 4,896,955 A | 1/1990 | Zider | 351/41 |
| 5,054,977 A * | 10/1991 | Schultz | 411/69 X |
| 5,067,827 A | 11/1991 | Bokel | 384/537 |
| 5,120,175 A | 6/1992 | Arbegast et al. | 411/501 |
| 5,190,546 A | 3/1993 | Jervis | 606/78 |
| 5,197,720 A | 3/1993 | Renz et al. | 269/48.1 |
| 5,226,683 A | 7/1993 | Julien et al. | 285/363 |
| 5,277,435 A | 1/1994 | Krammer et al. | 279/9.1 |
| 5,366,331 A | 11/1994 | Erbes | 411/433 |
| 5,385,396 A | 1/1995 | Beck et al. | 303/119.2 |
| 5,395,193 A | 3/1995 | Krumme et al. | 411/339 |
| 5,407,322 A | 4/1995 | Charbonnel et al. | 415/160 |
| 5,507,826 A | 4/1996 | Besselink et al. | 623/22 |
| 5,536,126 A | 7/1996 | Gross | 411/411 |
| 5,584,631 A | 12/1996 | Krumme et al. | 411/339 |
| 5,586,983 A | 12/1996 | Sanders et al. | 606/61 |
| 5,597,378 A | 1/1997 | Jervis | 606/78 |
| 5,662,362 A | 9/1997 | Kapgan et al. | 285/381.1 |
| 5,674,027 A | 10/1997 | Warnaar | 403/404 |
| 5,683,404 A | 11/1997 | Johnson | 606/151 |
| 5,689,873 A * | 11/1997 | Luhm | 411/69 X |
| 5,766,218 A | 6/1998 | Arnott | 606/151 |
| 5,779,281 A | 7/1998 | Kapgan et al. | 285/148.19 |
| 5,779,707 A | 7/1998 | Bertholet et al. | 606/75 |
| 5,791,847 A | 8/1998 | Keto-Tokoi | 411/368 |
| 5,842,312 A | 12/1998 | Krumme et al. | 52/167.1 |
| 5,858,020 A | 1/1999 | Johnson et al. | 623/23 |
| 5,862,995 A | 1/1999 | Wu | 239/533.2 |
| 5,876,434 A | 3/1999 | Flomenblit et al. | 623/1 |

OTHER PUBLICATIONS

Nitinol SE 508 Data Sheet, Nitinol Devices & Components, Inc. Revision A. ECO 1436.

* cited by examiner

Primary Examiner—Neill Wilson
(74) Attorney, Agent, or Firm—John Chiatalas

(57) ABSTRACT

According to an embodiment of the present invention, a fastening assembly has a first component containing a first aperture and a second component containing a second aperture. A pin made of a super-elastic alloy defines a shank with a bore having an axis, the shank being at least partially constrained within and juxtaposed with both the first and second apertures. Activation of the super-elastic alloy generates a retaining force normal to the axis of the pin, fastening the components together. Several embodiments are shown where a unitary pin fastens the components, while other embodiments are shown where the super-elastic properties of the pin are activated by another independent element of the fastener, for example a retainer that co-acts with the pin to fasten the components together. Activation forces can be applied to the pin through relative motion, or stretching against a shoulder.

9 Claims, 5 Drawing Sheets

SUPER-ELASTIC RIVET ASSEMBLY

TECHNICAL FIELD

The present invention relates generally to metallic fasteners, that is, devices for holding together two objects or parts that are sometimes required to be separate, particularly fasteners having one or more elements made of material that possesses super-elastic properties. The present fasteners are suitable for high-performance industrial applications involving different ranges of operating temperatures and component materials being fastened.

BACKGROUND

The present inventor has previously filed application Ser. No. 09/311,938 entitled "Stress Induced Seat" on May 14, 1999 and application Ser. No. 09/440,064 entitled "Stress Induced Gasket" on Nov. 15, 1999, the entire disclosures of which are expressly incorporated by reference herein and relied upon.

The use of metallic super-elastic alloys, such as Ni—Ti (nitinol) and other bi- or tri-metal alloys, has been documented in a variety of technical applications, including fasteners, connectors, clamps and seals. Many such uses have required temperature in order to activate the material and change its physical state, while others have used mechanical forces that impart stress to cause a super-elastic physical deformation in the material. Of particular concern to the instant inventor is the application of the super-elastic material to fasteners. The use of non-corrosive, metallic super-elastic material offers a decided advantage in high performance fastened assemblies, versus more conventional materials used in fasteners such as a bolt and nut, rivet, or a clevice pin. Particularly it can withstand more wear than alloys used in conventional fasteners due to its harder surface characteristics. It can also withstand extreme vibrations and not loosen due its elastic pre-loaded condition without using conventional adhesives to hold the assembled components and/or the fastener itself together. Adhesives used with conventional fasteners make them very difficult to disassemble, whereas it is generally possible to make a super-elastic fastener completely reversible. Moreover, super-elastic fasteners can be made that do not require the components being assembled to have special threads or other structures, which are more costly to manufacture.

U.S. Pat. Nos. 5,395,193 and 5,584,631 to Krumme et al., discuss the use of nickel-titanium shape memory retainers in an optimized elastic condition that have super-elastic or pseudo-elastic properties. These fasteners are said to be useful for eyeglass assembly, however, the pin used in these fasteners is not manufactured from super-elastic material. This type of pin, therefore, does not exhibit optimum wear characteristics against the movement between the eyeglass arm and the frame.

U.S. Pat. No. 5,683,404 to Johnson, entitled "Clamp and Method for its Use", further discusses shape memory materials that are "pseudo-elastic", defining these materials in terms of their ability to exhibit super-elastic/pseudo-elastic recovery characteristics at room temperature. Such materials are said to deform from an austenitic crystal structure to a stress-induced structure postulated to be martensitic in nature, returning thence to the austenitic state when the stress is removed. The alternate crystal structures described give the alloy super-elastic or pseudo-elastic properties. Poisson's Ratio for nitinol is about 0.3, but this ratio significantly increases up to approximately 0.5 or more when the shape memory alloy is stretched beyond its initial elastic limit. It is at this point that stress-induced martensite is said to occur, i.e., the point beyond which the material is permanently deformed and thus incapable of returning to its initial austenitic shape. A special tool is employed by Johnson to impart an external stretching force that deforms the material which force is then released to cause the material to return to its original condition. While the device is stretched, a member is captured by it and securely clamped when the stretching force is released. This device is intended for use in clamping and does not contemplate traditional fastening operations of the kind addressed by the present invention. Another use envisioned by Johnson is in connecting the modular components of a medical device, as described in his U.S. Pat. No. 5,858,020, by subjecting a component made of shape memory material to an external stretching stimulus to reduce its transverse dimension. Upon release, the dimension of this component is increased back toward its original size, contacting and imparting a force on an inter-positional member which, in turn, fastens to another component.

A binding or strap device is described in U.S. Pat. No. 5,766,218 to Arnott, ostensibly to provide compressive force via a unidirectional tensioning loop member of shape memory material. The loop is useful in maintaining a constant force on the attached members. This occurs as the tool imparts a stretching/tensioning force. The device bands tissue boundaries together however, its use as a fastener is rather limited.

In U.S. Pat. No. 5,197,720 to Renz, et al., a work piece is held within a clamping tool by an expansion element made of shape memory material that is activated by mechanical force. In this way, torque is transmitted through the shape memory member. U.S. Pat. No. 5,190,546 to Jervis discloses insertion into a broken bone cavity of a split member made of shape memory material using a super-elastic alloy. The split member holds the walls of the bone cavity when radial compressive forces acting on it are released. In order for the radial compressive force to reduce the diameter, the component must be split, allowing the reduction in dimension for insertion.

Others have sought to utilize the properties of shape memory materials as locking, connector and bearing elements, e.g., U.S. Pat. No. 5,507,826 to Besselink, et al., U.S. Pat. No. 5,779,281 to Kapgan, et al., and U.S. Pat. No. 5,067,827 to Arnold, respectively; however, such approaches have required temperature to be applied during use. U.S. Pat. No. 5,277,435 to Kramer, et al. and U.S. Pat. No. 5,876,434 to Flomenblit, et al. similarly has relied upon temperature to activate the shape memory effect. Such dependence on extrinsic activation by temperature introduces an added process step and may further be disadvantageous in certain other applications.

U.S. Pat. No. 5,842,312 to Krumme, et al., entitled, "Hysteretic Damping Apparati and Methods", employs shape memory tension elements to provide energy dissipation. Such elements can be placed between building structures, etc., which are subject to vibration, serving to absorb the energy created by their relative movement. However, this patent does not contemplate the vibration dampening effect of a super-elastic material in the formation of a fastener.

None of the above-mentioned prior approaches have contemplated the formation of an effective fastener such as envisioned by the present Inventor. Moreover, the aforementioned Krumme, et al patent, although used as a fastener, does not contemplate using a pin manufactured from a super-elastic material.

Accordingly, there is a need to form an assembly using a durable metallic, non-corrosive fastener, beginning with a pin made of a shape memory material in its austenitic state that induces a super-elastic retaining force via stress-induction so that it is juxtaposed with the members being fastened.

There is a further need to form a fastened assembly that dampens vibrations that cause typical fasteners to loosen.

There is another need to form a fastened assembly that does not require temperature for its activation.

There is still a need to form an assembly using a fastener that adjusts for differences in thermal coefficients of expansion or contraction of dissimilar materials comprising those components being fastened.

SUMMARY OF INVENTION

According to an embodiment of the present invention, a fastening assembly has a first component containing a first aperture and a second component containing a second aperture. A pin made of a super-elastic alloy defines a shank with a bore having an axis, the shank being at least partially constrained within and juxtaposed with both the first and second apertures. Activation of the super-elastic alloy generates a retaining force normal to the axis of the pin, fastening the components together.

In another embodiment of the present invention, a fastening assembly has a first component containing a first aperture and a second component containing a second aperture. A pin made of a super-elastic alloy defines a shank with a bore having an axis. The shank is at least partially constrained within and juxtaposed with both the first and second apertures. A retainer is moveable relative to the shank along the axis to activate the super-elastic alloy, fastening the components together. In alternative preferred embodiments the retainer can activate the pin on the outside of the shank or within the bore.

In yet another embodiment of the present invention a fastening assembly has a first component containing a first aperture and a second component containing a second aperture. A rivet made of a super-elastic alloy defining a shank with opposed ends and a bore having an axis. One of the opposing ends has a shoulder and the other end is constrained within and juxtaposed with both the first and second apertures. Another component telescopes within the bore, activating the super-elastic alloy to cause the other end of the shank to deform, retaining the components together.

In still another embodiment of the present invention a fastening assembly has a first component containing a first aperture and a second component containing a second aperture. A pin made of super-elastic alloy defines a shank with an initial length and an initial cross-sectional dimension. The shank has opposed ends and an axis. One of the opposing ends has a shoulder and a blind bore with a bottom. A stretching force is applied between the shoulder and the bottom of the bore causing the cross-sectional dimension and the shank to elongate. This allows the pin to enter into the first and second apertures. Release of the stretching force causes the shank to return towards its initial cross-sectional dimension to pressure lock it against the apertures.

In still yet another embodiment of the present invention a fastening assembly has a first component containing a first aperture and a second component containing a second aperture. A pin made of a super-elastic alloy defines a shank with an axis and a cross-sectional dimension sized to interfere with the apertures. Relative motion causes the apertures to contact and reduce the cross-sectional dimension, pressure locking it against the apertures.

An advantage of an embodiment of the present invention is that a super-elastic alloy, e.g., nickel-titanium has an oxide layer presenting a stronger wear surface than other traditional fasteners. Moreover, the shank of the pin is elastic in nature, allowing it to act as a vibration-dampening member that prevents the assembly from loosening. Also, the components of the present assembly are more forgiving of manufacturing tolerances. These fasteners are entirely reversible.

Another advantage of an embodiment of the present invention is that the pin can be cut into desired lengths from standard tube stock, while the retainer is made from more traditional fastener materials that can be easily machined.

A further advantage of an embodiment of the present invention is that a rivet can be used in sheet metal applications where the components being fastened together are thin. Unlike any other rivet this connection is reversible.

A still further advantage of an embodiment of the present invention is that the fastener can be activated before assembly allowing it to be maneuvered into place without applying any forces on the components. Further, the pin requires no additional elements to be assembled to it in order to fasten the components together.

Yet another advantage of an embodiment of the present invention involves a direct axial force applied to a unitary pin requiring no additional elements to be assembled in order to fasten the components together.

Other objects and advantages will be appreciated by those skilled in the art, by resort to the appended Drawings having reference numerals that correspond to the ensuing Description of one or more embodiments of the invention wherein the following Figures are further elucidated.

DETAILED DESCRIPTION OF THE DRAWINGS

Figure 1:
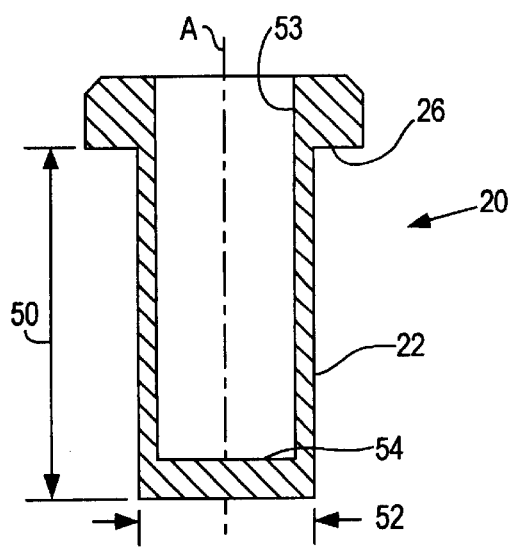
FIG. 1 is a cross-sectional view of a pin useful in a fastener of the present invention, shown prior to assembly.

Referring to FIGS. 1–10 a fastening assembly is generally shown at 10 with a first component 12 containing a first aperture 14 and a second component 16 containing a second aperture 18. A pin 20 made of a super-elastic alloy defines a shank 22 with a bore 24 having an axis A. Shank 22 is at least partially constrained within and juxtaposed with both the first 14 and second 18 apertures. Activation of the super-elastic alloy generates a retaining force normal to the axis A of the pin 20, fastening the components together. Preferably the pin 20 of FIGS. 1–9 has a shoulder 26. Additionally the shank 22 is preferably cylindrical.

Referring to FIGS. 6–9, fastening assembly 10 has first component 12 containing first aperture 14 and second component 16 containing second aperture 18. A pin 20 made of a super-elastic alloy defines a shank 22 with a bore 24 having an axis A. Shank 22 is at least partially constrained within and juxtaposed with both the first 14 and second 18 apertures. A retainer 28 is moveable relative to the shank 22 along axis A to activate the super-elastic alloy, fastening the components together. Retainer 28 thus holds pin 20 in place or position. When the retainer 28 is urged into contact with the pin 20 internal stress builds until a strain energy threshold is reached. Once reached the super-elastic properties of the material are activated. This allows retainer 28 to deform pin 20 and attach, fastening the first 12 and second 16 components together. In a preferred embodiment (FIGS. 6–7) the retainer 28 has a third aperture 32 and is moved along axis A. Opposing forces indicated by arrows 30 activate pin 20 generating an outwardly directed retaining force exerted by shank 22 against the third aperture 32 of the retainer 28 reducing a cross-sectional dimension of a portion 34 of the shank. In another preferred embodiment (FIGS. 8–9) the retainer 28 has a protrusion 36 and is moved along axis A. A compressive force indicated by arrows 30 activates pin 20, generating an inwardly directed retaining force exerted by bore 24 against the protrusion 36 of the retainer 28 increasing a cross-sectional dimension of a portion 38 of the shank. In still another preferred embodiment the fastener 10 has two retainers 28.

Figure 4:
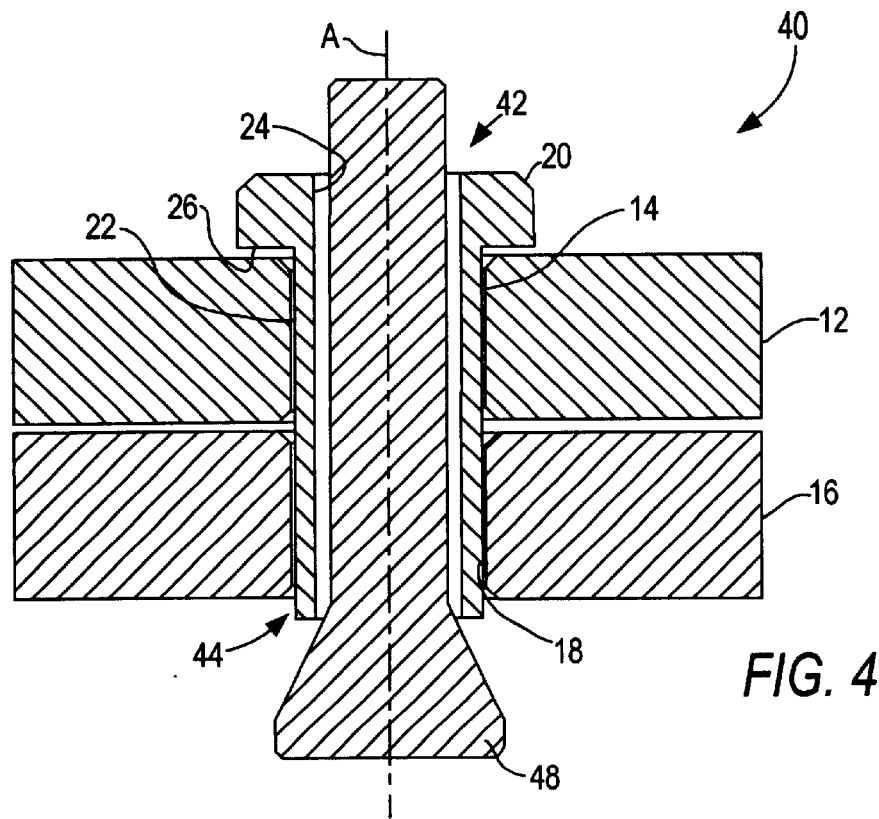
FIG. 4 is a cross-sectional view of a rivet useful in the assembly of the present invention, prior to activation of the pin by a telescoping shaft.
Figure 5:
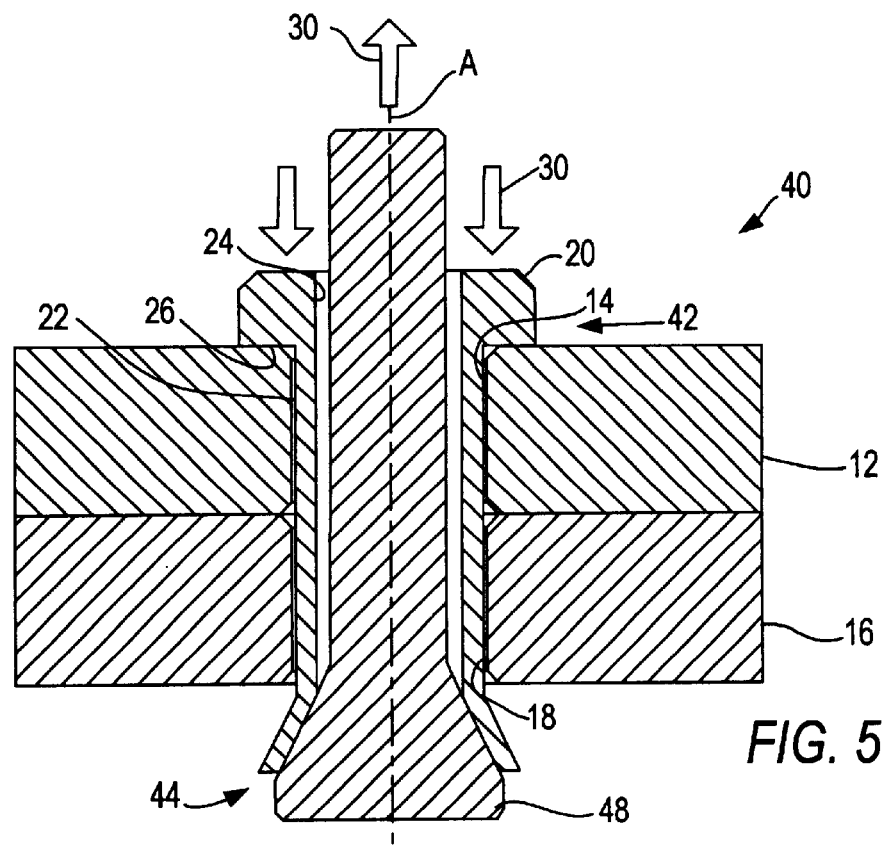
FIG. 5 is a sequential view of FIG. 4, shown during activation wherein the pin is deformed with a flared end.
Figure 6:
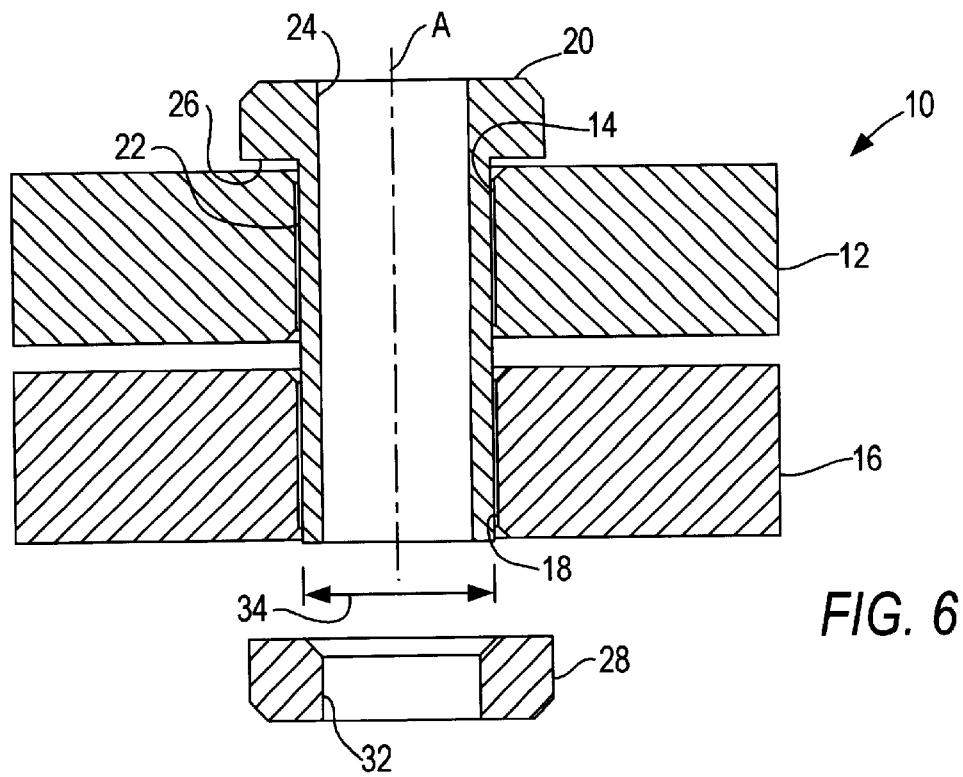
FIG. 6 is an exploded cross-sectional view of a fastener useful in the present invention prior to assembly with a retainer.
Figure 7:
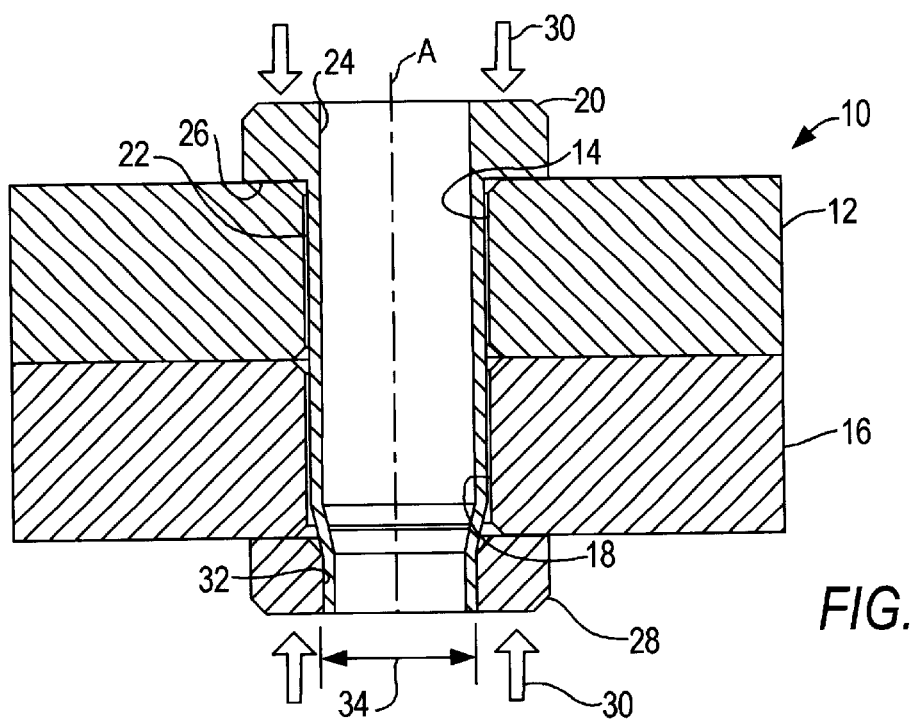
FIG. 7 is a sequential view of FIG. 6, showing the retainer fastening the components onto a shank of the pin.
Figure 8:
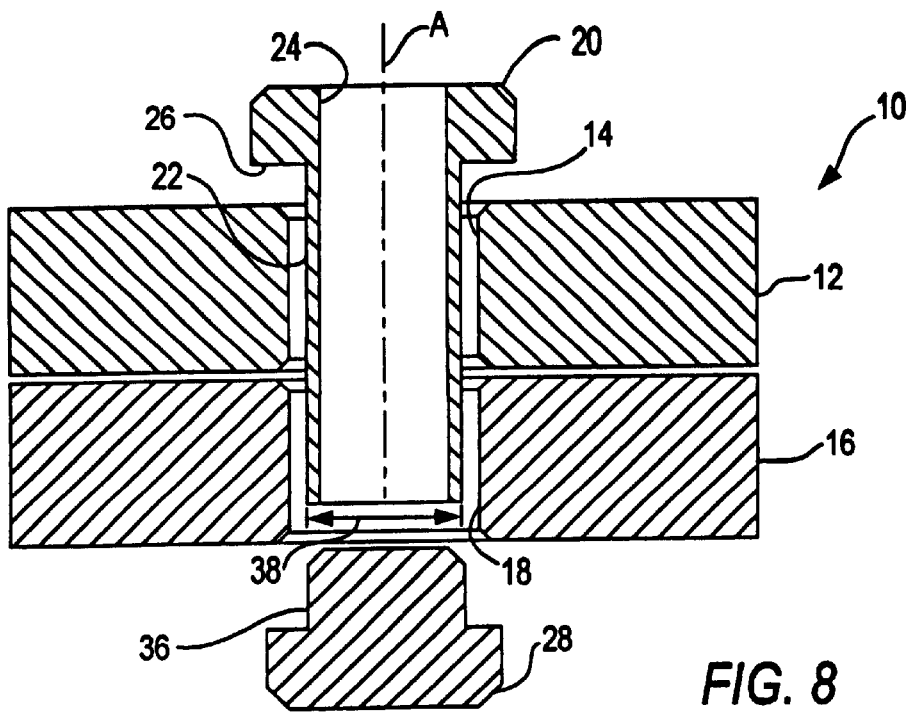
FIG. 8 is an exploded cross-sectional view of a fastener useful in the present invention prior to assembly with a retainer.
Figure 9:
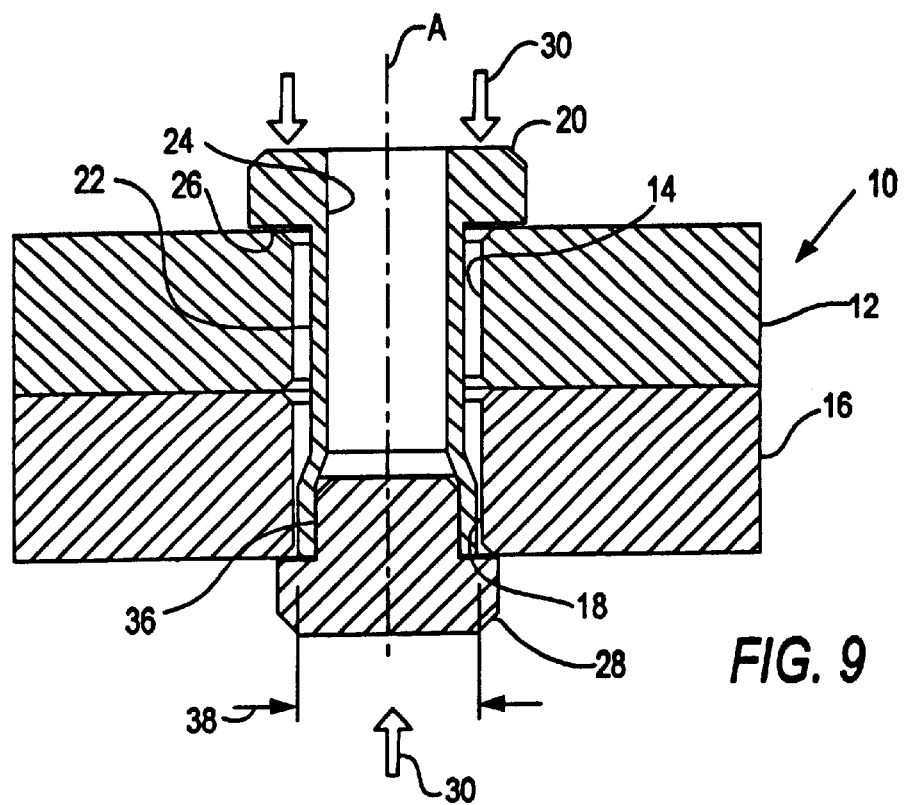
FIG. 9 is a sequential view of FIG. 8, showing the retainer within a bore of the pin, fastening the components onto a shank of the pin.

Referring to FIGS. 4–5, fastening assembly 10 has first component 12 containing first aperture 14 and second component 16 containing second aperture 18. A rivet 40 made of a super-elastic alloy defines shank 22 with opposed ends 42, 44 and bore 24 having axis A. One of the opposing ends 42 has a shoulder 26 and the other end 44 is constrained within and juxtaposed with both the first 14 and second 18 apertures. Another telescoping component 48 when urged by opposing forces indicated by arrows 30 moves within the bore 24, activating the super-elastic alloy to cause the other end 44 of shank 22 to deform, retaining the components together. When telescoping component 48 is, urged into contact with bore 24, internal stress builds until a strain energy threshold is reached. Once reached the super-elastic properties of the material are activated. This allows telescoping component 48 to deform pin 20 and attach, fastening the first 12 and second 16 components together.

Figure 2:
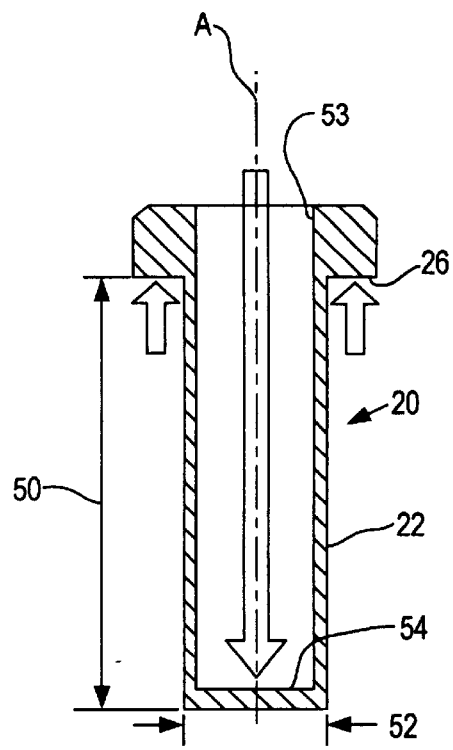
FIG. 2 is a sequential view of FIG. 1, showing a stretching force being applied to the pin to change its dimensions.
Figure 3:
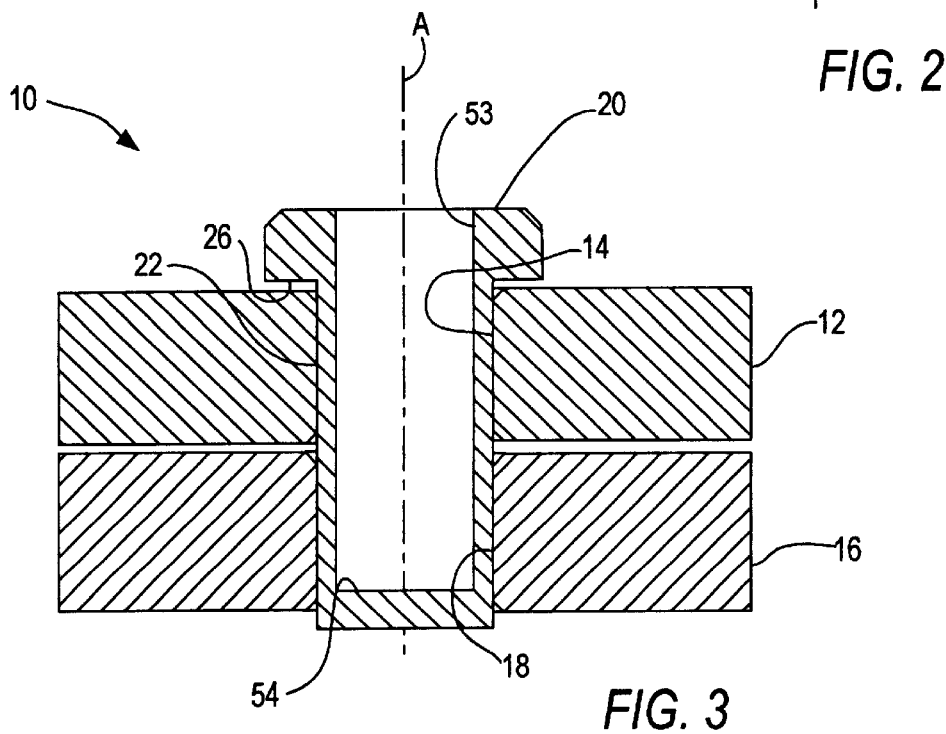
FIG. 3 is a further sequential view of FIG. 2, showing the final assembly with the pin returned towards its original dimensions, pressure-locked against the apertures of two components being fastened.

Referring to FIGS. 1–3, fastening assembly 10 has a first component 12 containing a first aperture 14 and a second component 16 containing a second aperture 18. A pin 20 made of a super-elastic alloy defines a shank 22 with a length 50 and a cross-sectional dimension 52. Shank 22 has opposed ends 42, 44 and an axis A. One of the opposing ends 42 has a shoulder 26 and a blind bore 53 with a bottom 54. A stretching force indicated by arrows 30 is applied between the shoulder 26 and the bottom 54 of the blind bore 53. This causes the internal stress to reach a strain energy threshold creating a super-elastic response in the material in turn allowing the cross-sectional dimension 52 to shrink and the shank 22 to elongate. This allows pin 20 to enter into the first 14 and second 18 apertures. Release of the stretching force indicated by arrows 30 causes the shank 22 to return towards its initial cross-sectional dimension 52, to pressure lock it against the first 14 and second 18 apertures.

Figure 10:
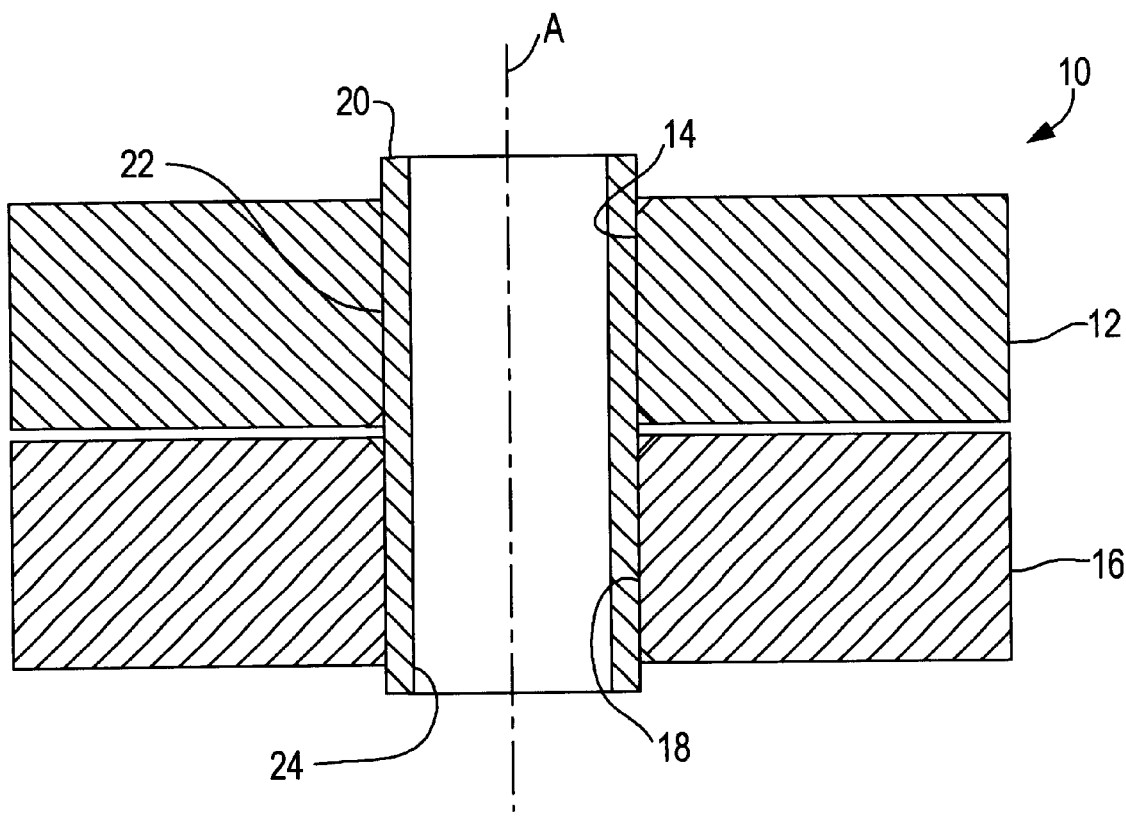
FIG. 10 is a cross-sectional view of an assembled fastener of the invention, showing a pin of the type useful in the invention being pressure locked against apertures of a pair of components being fastened together by the pin.

Referring to FIG. 10, a fastening assembly 10 has a first component 12 containing a first aperture 14 and a second component 16 containing a second aperture 18. A pin 20 made of a super-elastic alloy defines a shank 22 with an axis A and a cross-sectional dimension 52 sized to interfere with the first 14 and second 18 apertures. A force indicated by arrows 30, preferably applied to pin 20, causes relative motion that brings the pin into intimate contact with the first 14 and second 18 apertures, respectively. During activation an internal stress on the pin 20 causes it to reach a strain energy threshold creating a super-elastic response further reducing the cross-sectional dimension 52 allowing it to enter the first 14 and the second 18 apertures. Alternatively, in another preferred embodiment (not shown) the first component 12 and/or the second component 16 can be moved while pin 20 is held in a fixed position.

Pin 20 is a slender metal tube received within, e.g., first 14 and second 18 apertures or third aperture 32 to fasten components 12, 16 together. Pin 20 is made of a shape memory alloy such as nitinol, in its super-elastic state in which applied stress results in a reversible martensitic phase transition. When pin 20 is activated by applied stress, and providing that its temperature is maintained substantially above its austenite finish temperature (the temperature at which the alloy is completely in its austenitic form), a transition from the austenite phase to the martensite phase occurs. This is known as stress induced martensite formation and is the basis for the phenomenon known as pseudoelasticity or super-elasticity. The shape memory alloy will remain at least partially in the martensite phase as long as the external stress is maintained. More preferably, the nitinol alloy used herein is SE508 nitinol. This material is described in "Nitinol SE508 Data Sheet", available from Nitinol Devices & Components, Inc., located in Fremont, Calif. Pin 20 is preferably an integral member manufactured from pin stock or tube stock. Preferably the operation temperature allows the material to remain in an austenitic state during use. Preferably the super-elastic material is pre-loaded in the fastened state and aids in further keeping the assembly 10 together during thermal cycling and while being subjected to vibration.

What is claimed is:

1. A fastening assembly comprising:

a first component containing a first aperture;

a rivet made of a super-elastic alloy defining a shank with opposed ends and a bore having an axis, a first of the opposed ends constrained within and juxtaposed with the first aperture; and a telescoping component aligned with the axis having a portion sized in interference with the bore; whereupon relative motion along the axis between the rivet and the telescoping component urges the interfering portion into contact with the bore causing a stress induced reaction in the rivet that elastically deforms it, capturing the telescoping component in a reversible fashion and retaining the assembly together.

2. The assembly of claim 1 wherein the bore is a through bore.

3. The assembly of claim 1 wherein the shank has a second of the opposed ends further including a shoulder.

4. The assembly of claim 1 further comprises a second component with a second aperture wherein the rivet is constrained within and juxtaposed with both the first and the second apertures.

5. The assembly of claim 1 wherein the rivet is a titanium alloy.

6. The assembly of claim 1 wherein the telescoping component can be removed from the rivet to reverse the assembly and both the telescoping component and the rivet are reusable.

7. The assembly of claim 1 further comprising a second telescoping component.

8. The assembly of claim 7 wherein the bore is a through bore.

9. A fastening assembly comprising:

a first component containing a first aperture;

a second component containing a second aperture;

a reusable rivet made of a titanium super-elastic alloy defining a shank with opposed ends and a bore having an axis, one of the opposed ends including a shoulder, the rivet being constrained within and juxtaposed with the first and second apertures; and a telescoping component aligned with the axis having a portion sized in interference with the bore; whereupon relative motion along the axis between the rivet and the telescoping component urges the interfering portion into contact with the bore causing a stress induced reaction in the rivet that elastically deforms it, capturing the telescoping component in a reversible fashion and retaining the assembly together.

* * * * *